(12) United States Patent
Kracht

(10) Patent No.: US 6,804,712 B1
(45) Date of Patent: Oct. 12, 2004

(54) IDENTIFYING LINK FAILURES IN A NETWORK

(75) Inventor: James Kracht, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 532 days.

(21) Appl. No.: 09/607,748

(22) Filed: Jun. 30, 2000

(51) Int. Cl.[7] .................. G06F 15/173; G06F 11/00
(52) U.S. Cl. .................. 709/223; 709/224; 714/4
(58) Field of Search .................. 709/223–224; 370/216, 222, 242, 254–258; 714/4

(56) References Cited

U.S. PATENT DOCUMENTS

| | | | | |
|---|---|---|---|---|
| 5,079,767 A | * | 1/1992 | Perlman | 370/408 |
| 5,436,909 A | * | 7/1995 | Dev et al. | 714/4 |
| 5,606,669 A | * | 2/1997 | Bertin et al. | 709/223 |
| 5,627,766 A | * | 5/1997 | Beaven | 709/224 |
| 5,706,440 A | | 1/1998 | Compliment et al. | 395/200.54 |
| 5,710,885 A | * | 1/1998 | Bondi | 709/224 |
| 5,796,736 A | | 8/1998 | Suzuki | 370/399 |
| 5,822,305 A | * | 10/1998 | Vaishnavi et al. | 709/224 |
| 5,845,149 A | | 12/1998 | Husted et al. | 395/829 |
| 5,910,803 A | * | 6/1999 | Grau et al. | 709/224 |
| 6,108,702 A | | 8/2000 | Wood | 709/224 |
| 6,131,119 A | | 10/2000 | Fukui | 709/224 |
| 6,163,529 A | * | 12/2000 | Nagel et al. | 370/244 |
| 6,173,411 B1 | * | 1/2001 | Hirst et al. | 709/223 |
| 6,205,122 B1 | * | 3/2001 | Sharon et al. | 709/223 |
| 6,347,073 B1 | * | 2/2002 | Hiscock et al. | 370/217 |
| 6,360,333 B1 | * | 3/2002 | Jansen et al. | 709/202 |
| 6,438,705 B1 | * | 8/2002 | Chao et al. | 709/226 |

* cited by examiner

Primary Examiner—Glenton B. Burgess
Assistant Examiner—Anita Choudhary
(74) Attorney, Agent, or Firm—Hickman Palermo Truong & Becker LLP

(57) ABSTRACT

A mechanism for identifying link failures in a network is disclosed. To identifying link failures, a failed-link discovery mechanism receives information that represents a physical topology of the network. A management station that is associated with the network is identified and a path between one or more devices of the network and the management station is determined. For each link, a set of beyond link devices, that identifies only those devices that are beyond a particular link relative to the management station, is identified. Thereafter, a first message is sent to each active device within the network. Based on the responses that are returned in response to the first messages, a set of non-responding devices within the network is determined. The set of non-responding devices is then compared to each set of beyond link devices to identify link failures within the network.

23 Claims, 16 Drawing Sheets

FIG. 5

LINK VECTOR TABLE 500

| PATH MATRIX FROM MNGMNT STATION | TO MGMT STATION DEVICE 302 | TO INTERNET DEVICE 304 | TO ROUTER A DEVICE 306 | TO SWITCH B DEVICE 308 | TO BLACK CLOUD DEVICE 310 | TO HUB F DEVICE 312 | TO ROUTER D DEVICE 314 | TO ROUTER E DEVICE 316 | TO SWITCH C DEVICE 318 |
|---|---|---|---|---|---|---|---|---|---|
| VECTOR OF LINKS | -- | LINK 320 | LINK 320 LINK 322 | LINK 320 LINK 322 LINK 324 | LINK 320 LINK 322 LINK 324 LINK 326 | LINK 320 LINK 322 LINK 324 LINK 326 LINK 328 | LINK 320 LINK 322 LINK 324 LINK 326 LINK 330 LINK 332 | LINK 320 LINK 322 LINK 324 LINK 326 LINK 330 | LINK 320 LINK 322 LINK 324 LINK 326 LINK 330 LINK 334 |

502 →  (pointing to TO ROUTER D column)

FIG. 6

LINK VECTOR TABLE 600

| PATH MATRIX FROM MNGMNT STATION | TO MGMT STATION | TO INTERNET | TO ROUTER A | TO SWITCH B | TO BLACK CLOUD | TO HUB F | TO ROUTER D | TO ROUTER E | TO SWITCH C |
|---|---|---|---|---|---|---|---|---|---|
| | DEVICE 402 | DEVICE 404 | DEVICE 406 | DEVICE 408 | DEVICE 410 | DEVICE 412 | DEVICE 414 | DEVICE 416 | DEVICE 418 |
| VECTOR OF LINKS | — | LINK 420 LINK 424 LINK 422 | LINK 420 LINK 424 | LINK 420 | LINK 420 LINK 426 | LINK 420 LINK 426 LINK 428 | LINK 420 LINK 426 LINK 430 LINK 432 | LINK 420 LINK 426 LINK 430 | LINK 420 LINK 426 LINK 430 LINK 434 |

BEYOND LINK DEVICE TABLE 700

| PATH MATRIX FROM MNGMNT STATION | INTERNET DEVICE 304 | ROUTER A DEVICE 306 | SWITCH B DEVICE 308 | BLACK CLOUD DEVICE 310 | HUB F DEVICE 312 | ROUTER D DEVICE 314 | ROUTER E DEVICE 316 | SWITCH C DEVICE 318 |
|---|---|---|---|---|---|---|---|---|
| LINK 320 | YES | YES | YES | YES | YES | YES | YES | YES |
| LINK 322 | NO | YES | YES | YES | YES | YES | YES | YES |
| LINK 324 | NO | NO | YES | YES | YES | YES | YES | YES |
| LINK 326 | NO | NO | NO | NO | YES | NO | YES | YES |
| LINK 328 | NO | NO | NO | NO | NO | YES | NO | NO |
| LINK 330 | NO | NO | NO | NO | NO | YES | YES | YES |
| LINK 332 | NO | NO | NO | NO | NO | YES | NO | NO |
| LINK 334 | NO | NO | NO | NO | NO | NO | NO | YES |

FIG. 8

BEYOND LINK DEVICE TABLE 800

| DEVICES BEYOND LINK | INTERNET DEVICE 404 | ROUTER A DEVICE 406 | SWITCH B DEVICE 408 | BLACK CLOUD DEVICE 410 | HUB F DEVICE 412 | ROUTER D DEVICE 414 | ROUTER E DEVICE 416 | SWITCH C DEVICE 418 |
|---|---|---|---|---|---|---|---|---|
| LINK 420 | YES | YES | YES | YES | YES | YES | YES | YES |
| LINK 422 | YES | NO | NO | NO | NO | NO | NO | NO |
| LINK 424 | YES | YES | NO | NO | YES | NO | NO | NO |
| LINK 426 | NO | NO | NO | YES | NO | YES | YES | YES |
| LINK 428 | NO | NO | NO | NO | YES | NO | NO | NO |
| LINK 430 | NO | NO | NO | NO | NO | YES | YES | YES |
| LINK 432 | NO | NO | NO | NO | NO | YES | NO | NO |
| LINK 434 | NO | NO | NO | NO | NO | NO | NO | YES |

802 →

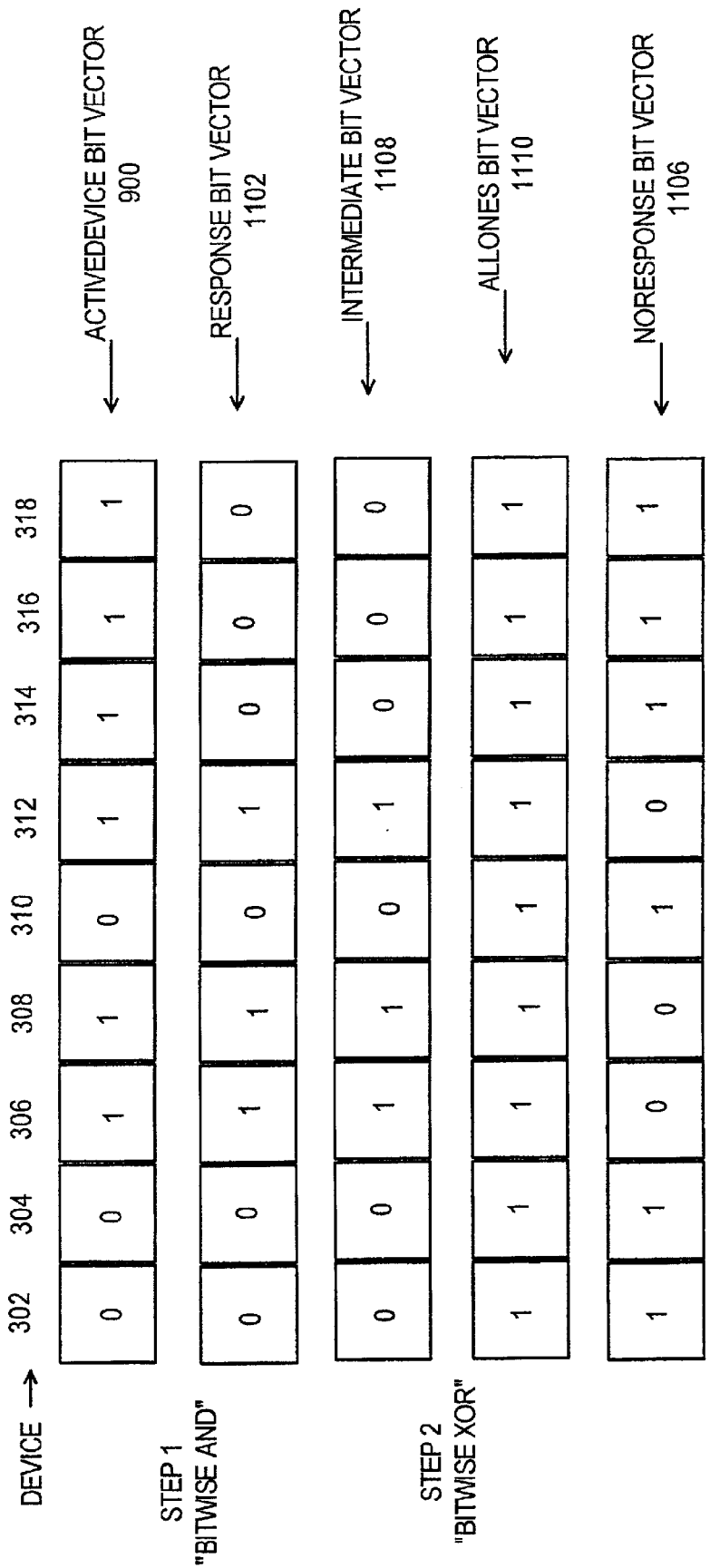

IDENTIFYING LINK FAILURES IN A NETWORK

FIELD OF THE INVENTION

The present invention generally relates to the management of network systems, and more specifically to identifying link failures in a network.

BACKGROUND OF THE INVENTION

A computer network generally includes a number of devices, including switches, routers and hubs, connected so as to allow communication among the devices. The devices within a network are often categorized into two classes: end stations such as workstations, desktop PCs, printers, servers, hosts, fax machines, and devices that primarily supply or consume information; and network devices such as gateways, switches and routers that primarily forward information between the other devices.

Network devices ordinarily operate on a continuous basis. Each device has one or more circuit boards, a microprocessor and a memory, and runs a control program. In general, networks often include several different types of data switching and routing devices. These network devices may have different physical characteristics. New devices, with characteristics that are presently unknown, are constantly being developed. In addition, the characteristics of many network devices may change over time. For example, characteristics of the network devices change when subsystems like boards, network interface modules, and other parts are added or removed from a device.

Many networks are managed, supervised and maintained by a network administrator or network manager. To properly maintain a network, the network administrator needs to have up-to-date information available about the devices in the network and how the devices are interconnected. The OSI network reference model is useful in classifying network management information. Information about what devices are in the network is generally called Layer 3 information, and information about how the devices are physically connected within the network is called Layer 2 information. In combination, this information may be used by the network administrator to understand the physical topology of the network. The topology is a mapping that indicates the type of devices that are currently included in the network and how the interfaces of these devices are physically linked.

In addition to understanding the physical topology of the network, the network administrator must have the ability to determine when a network failure has occurred. In addition, the network administrator must also have the ability to identify and isolate a particular failure that has occurred within the network, as a single failure can often affect the ability to communicate between many devices throughout the network.

For example, FIG. 1 illustrates a network 100 that includes a plurality of devices (A–G) that are configured to communicate with each other over links 102, 104, 106, 108, 110, 112. Devices A, B, C, D, E, F are, e.g., routers, switches, gateways, end stations, etc. If a communication failure occurs between device B and device C (a failure of link 106), the ability to communicate between device B and device C is affected, and the ability to communicate between devices (A, G) and devices (D, E, F) is affected. Thus, to be able to address and correct a particular link failure, the network administrator needs to be able to determine that a failure has occurred within the network 100, and to identify and isolate the specific link within the network that has failed.

One method for identifying and isolating a specific link failure within a network is by probing the end-points of each link (pair of devices at the end of each link) to obtain communication data for each of the devices. For example, referring to FIG. 1, to isolate a failure within network 100, the network administrator may attempt to contact the end-points of each link 102, 104, 106, 108, 110, 112 within network 100 to retrieve SNMP data from each of the devices A, B, C, D, E, F, G. Based on the SNMP data that is retrieved, the network administrator may attempt to isolate the specific link that has failed within the network. However, a drawback with using this technique to isolate failures is that the SNMP data may not be readily available for each of the devices within the network. For example, the network administrator may not have access to the specific community string that is required to read the SNMP data from one or more devices with the network. Thus, the network administrator may not be able to retrieve the necessary information to identify the particular link that has failed. In addition, probing each device within the network to obtain the communication information can significantly increase traffic in the network, potentially reducing throughput of the network.

Moreover, a further drawback with probing the end-points of each link is that there may be any number of reasons that a particular link has failed. Thus, the network administrator generally needs to check a variety of different parameters on each device in attempting to determine whether a particular link is down.

In addition, many devices do not have as SNMP agents and therefore cannot provide the network administrator with SNMP data. For example, certain devices may be configured as proprietary devices that require the use of a specific protocol to retrieve communication information. Thus, the network administrator must be able to communicate using each of the communication protocols that are required by each of the devices. Still further, certain "dumb" devices may not provide any mechanism for retrieving management information that will allow the network administrator to determine whether a particular link has failed. Thus, the network administrator may have no mechanism for communicating with certain devices of the network.

Furthermore, certain types of failures may not be detectable based on the communication parameters of each device. For example, if a Layer 3 failure occurs between devices B and C (link 106), even if the communication parameters such as the Interface tables (IF tables) for devices B and C are available to the network administrator, generally they will not provide the information that is needed to determine that link 106 has failed. Thus, even if the network administrator is able to obtain the SNMP data for each of the devices within the network, it still may be impossible to identify the specific link that has failed.

Based on the foregoing, there is a clear need for a mechanism that can determine that a failure has occurred within a network.

There is also is a clear need for a mechanism that can identify and isolate a particular link that has failed within a network.

It is also desirable to have a mechanism that can identify a link failure without generating an undue amount of traffic within the network.

SUMMARY OF THE INVENTION

The foregoing needs, and other needs and objects that will become apparent from the following description, are achieved in the present invention, which comprises, in one aspect, a method for identifying link failures in a network. In one embodiment, information that represents a physical topology of the network is retrieved. A management station that is associated with the network is identified, and a path between one or more devices of the network and the management station is determined. Each path consists of one or more links connecting one or more devices within the network. For each link, a set of beyond link devices is determined that identifies only those devices that are beyond that particular link relative to the management station. A message is sent from the management station to one or more active devices within the network. Each message requests a response message to be returned to the management station from the device for which the message was sent. A set of non-responding devices, which consists of those devices that did not respond to the message sent from the management station to the device is determined. The set of non-responding devices is compared to each set of beyond link devices to identify link failures within the network.

The invention also encompasses a computer-readable medium, a computer data signal embodied in a carrier wave, and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 illustrates a Link Vector table that depicts a mapping, for the network topology of FIG. 3, of each vector of links that are traversed to reach each device from management station;

FIG. 6 illustrates a Link Vector table that depicts a mapping, for the network topology of FIG. 4, of each vector of links that are traversed to reach each device from management station;

FIG. 7 illustrates a Beyond Link Device table that indicates whether a device is beyond a specific link from the perspective of the management station based on the Link Vector table of FIG. 5;

FIG. 8 illustrates a Beyond Link Device table that indicates whether a device is beyond a specific link from the perspective of the management station based on the Link Vector table of FIG. 6;

FIG. 11C illustrates a method for identifying the devices beyond a link that have failed to respond to the management station;

DETAILED DESCRIPTION OF THE PREFERRED EMBODIMENT

A method and apparatus for identifying link failures in a network is disclosed.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Operational Context

Figure 2A:
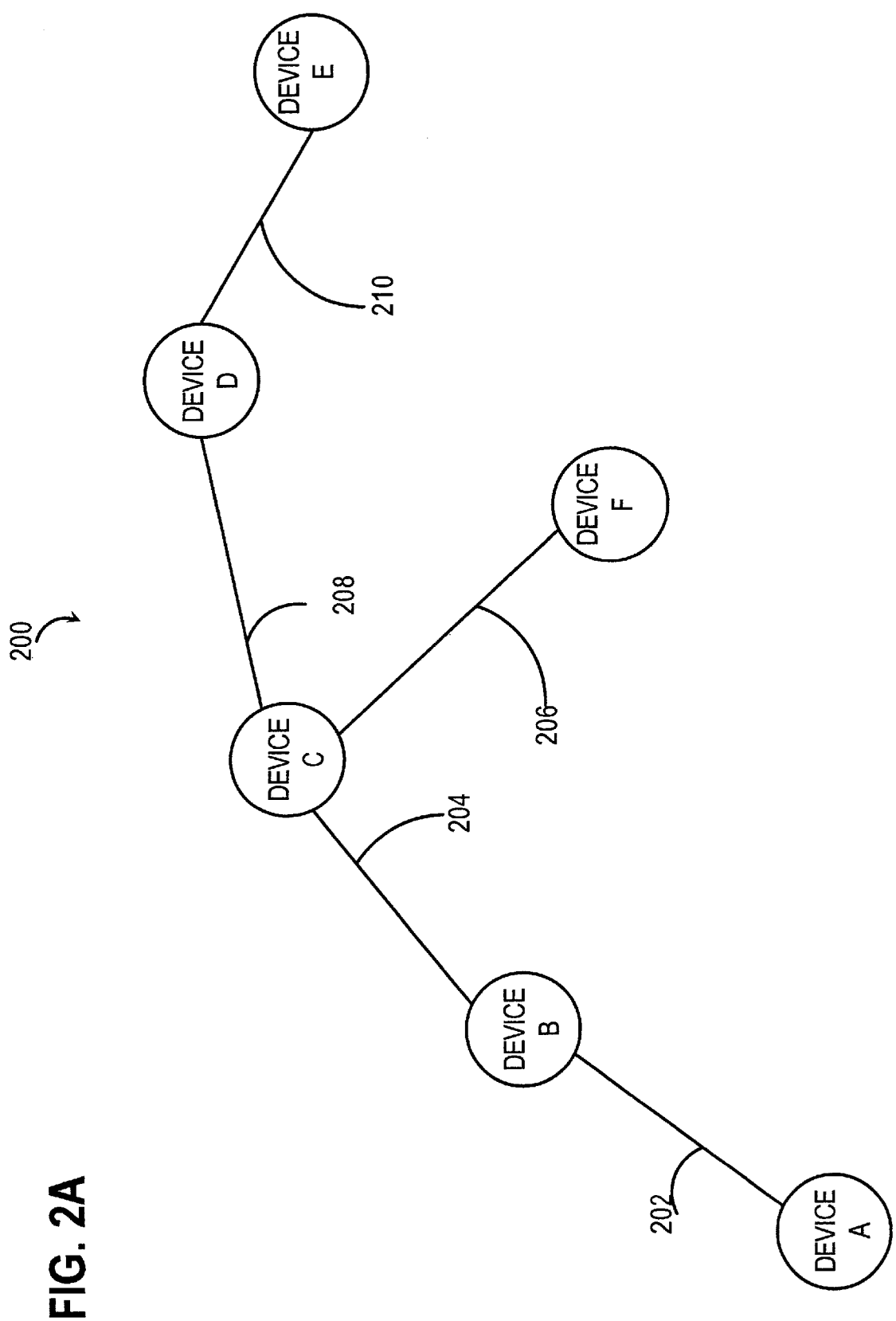
FIG. 2A illustrates an example of a network that does not include any redundant paths.
Figure 2B:
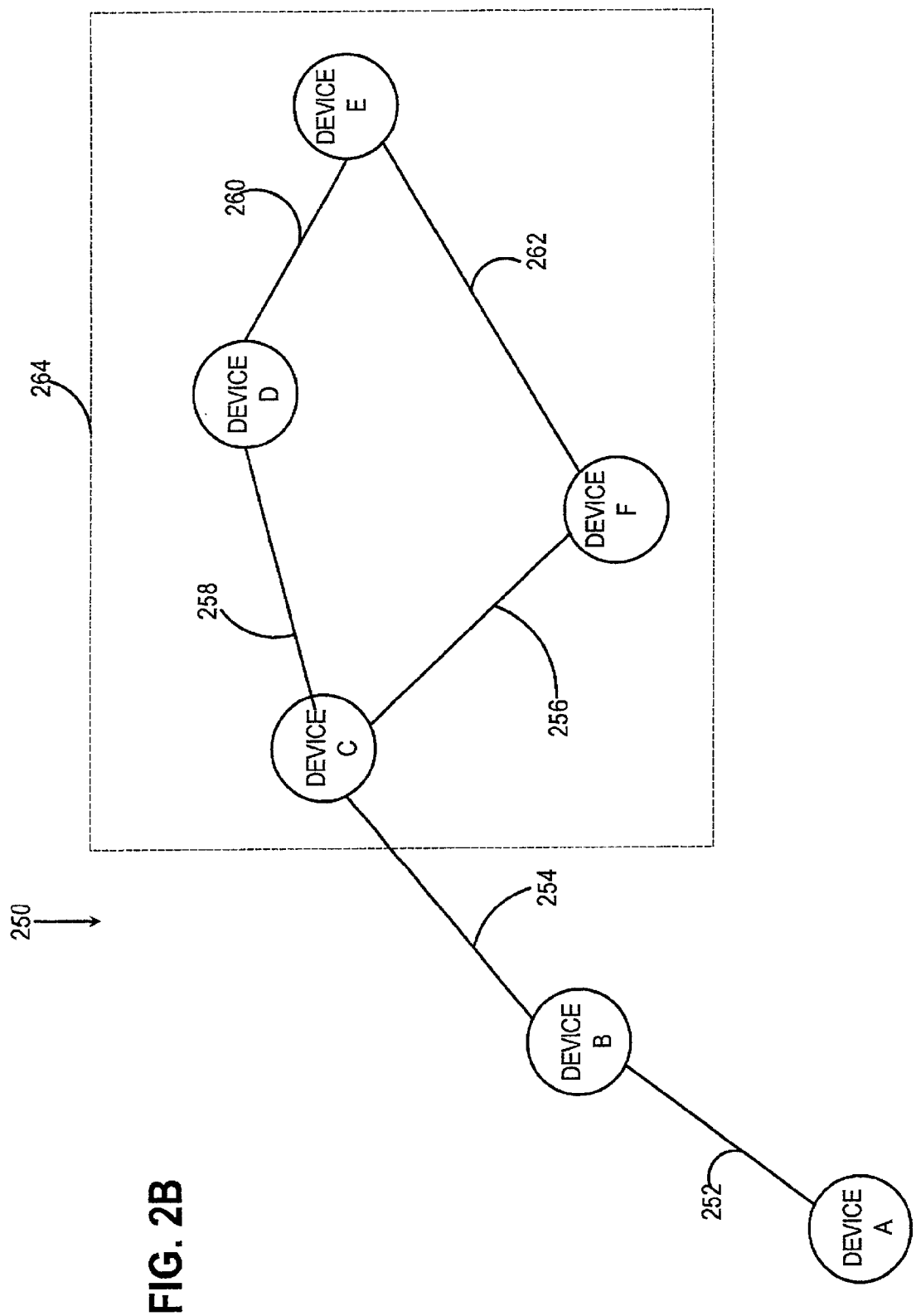
FIG. 2B illustrates a network that includes a redundant path that provides multiple communication paths for communicating between one or more devices pairs.

A method and apparatus for identifying link failures in a network is disclosed ('failed-link discovery mechanism"). In one embodiment, the failed-link discovery mechanism obtains the physical topology of a network. After obtaining the physical topology, the failed-link discovery mechanism verifies that there are no redundant paths within the network. As used herein, a redundant path network is any network that includes multiple communication paths for communicating between one or more device pairs. FIG. 2A illustrates an example of a network 200 that does not include any redundant paths. FIG. 2B illustrates a network 250 that includes a redundant path 264 (links 256, 258, 260, 262) that provides multiple communication paths for communicating between one or more devices pairs. Methods based on mathematical graph theory may be used to determine whether a particular network includes one or more redundant paths.

If it is determined that the network does not include any redundant paths, the failed-link discovery mechanism identifies the location of the network management station relative to the network. That is, the failed-link discovery mechanism determines whether the network management station is connected to a particular device within the network, or whether the network management station is located outside the network and thus connected through another network, for example, the Internet.

Upon locating the network management station, a path from the network management station to each device within the network is identified as a vector of links. For each identified link in the vector, the failed-link discovery mechanism then calculates a "set of beyond link devices" that includes those devices that are beyond the link vector from the perspective of the network management station. For example, referring to FIG. 2A, assuming the network management station is connected to device A, the vector of links from the network management station to device D consists of links (202, 204, 208) and the set of beyond link devices for the vector of links (202, 204, 208) consists of devices (D, E).

Once the vector of links and sets of beyond link devices are identified, the failed-link discovery mechanism periodically polls devices within the network to determine a set of zero or more non-responding devices. The set of non-responding devices is then compared to each set of beyond link devices. Based on this comparison, if a link within the network has failed, the failed-link discovery mechanism can identify and isolate the specific link that has failed.

The process of identifying a failed link within a network will now be described as a plurality of phases. These phases include a "network topology verification" phase, a "network information gathering" phase and a "link failure processing" phase. Each phase represents a set of operations that is used to perform a particular function.

Networkn Topology Verification Phase

A network topology verification phase consists of obtaining network topology information and verifying that the topology has no redundant paths.

1. Obtaining a Network Physical Topology.

In one embodiment, the failed-link discovery mechanism obtains or determines the physical topology of a network. Several methods may be used to determine the physical topology of a network, and embodiments of the invention are not limited to any particular method. One method is described in copending application Ser. No. 09/302,531, filed Apr. 20, 1999, by Kracht entitled DETERMINING A PHYSICAL TOPOLOGY OF NETWORK DEVICES IN A NETWORK ("Kracht"), which is hereby incorporated by reference in its entirety as if fully set forth herein. For explanation purposes, certain terms defined in Kracht are used herein.

2. Verifying no Redundant Path.

After obtaining the network topology, the failed-link discovery mechanism verifies that the network does not include any redundant paths among the "active" devices. For example, a network topology may include both (1) "actual" or "active" devices, for example routers, switches, hubs that when polled are expected to respond, and (2) "virtual" or "non-active" devices, for example a black cloud device or the Internet which, because they are not represented by a single identified actual device, may not be polled and therefore do not respond. The virtual or non-active devices may represent a collection of devices, for example a black cloud device as described in Kracht, that includes one or more redundant paths. In certain embodiments, because the failed-link discovery mechanism treats each virtual device as a single device within the network topology, the failed-link discovery mechanism only verifies that no redundant paths exist between the "active" devices.

Several mathematical techniques based on graphs may be used to verify that a network does not include any redundant paths, and embodiments of the invention may include a variety of different methods for verifying the absence of any redundant paths within the network. As a result, network topology information is created and stored.

Network Information Gathering Phase

1. Locating the Network Management Station.

Once the network topology is obtained and verified, the failed-link discovery mechanism locates a management station for gathering information about the network. In one embodiment, the management station is a process or group of processes that are configured to perform algorithms necessary to identify and isolate link failures within the network. The management station is associated with or connected to a device that is configured to communicate with the devices within the network. The management station may function as a dedicated computing device that is configured to communicate with the network devices, or may be only one of several functions that are performed by the particular device. For example, the management station may be associated with a router or hub, or any other network device that will support the execution of management station functions. In one embodiment, the management station is the device at which the failed-link discovery mechanism executes.

Figure 3:
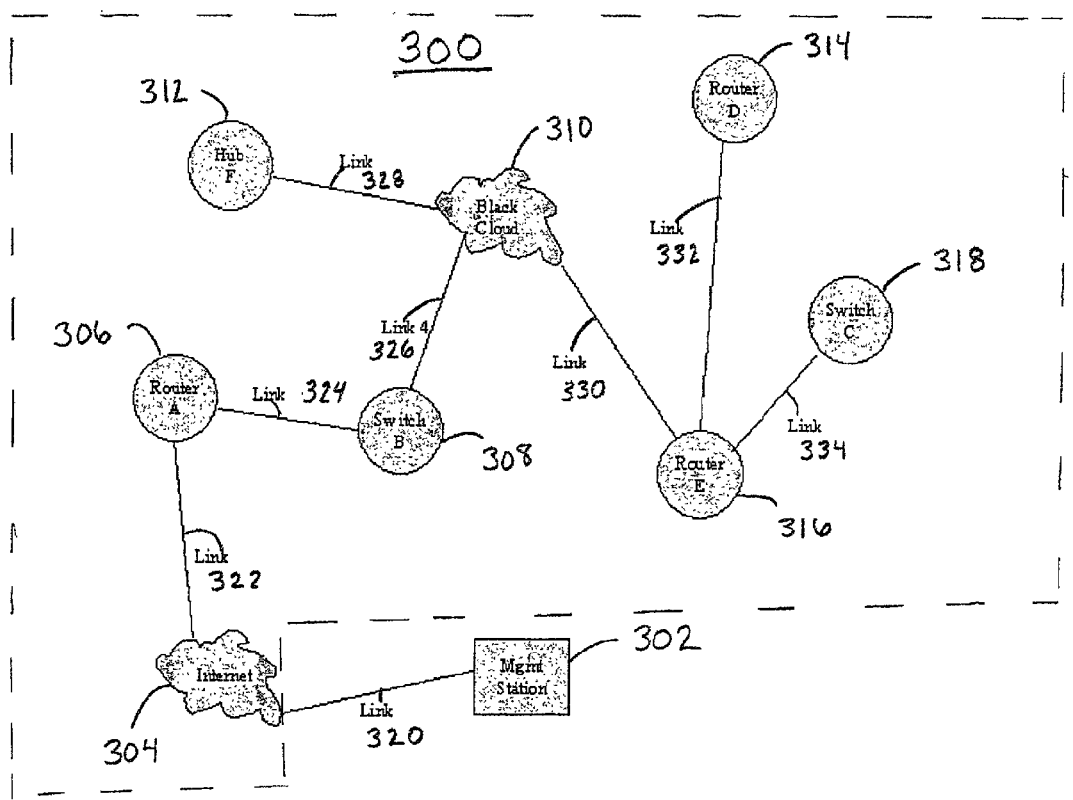
FIG. 3 illustrates an example of a management station that is located outside a network topology.

In certain embodiments, the management station may be located either within or outside the network of interest. FIG. 3 illustrates an example of a management station 302 that is located outside a network topology 300,which includes a plurality of devices (304, 306, 308, 310, 312, 314, 316, 318) that are configured to communicate over links (322, 324, 326, 328, 330, 332, 334). In this example, management station 302 is located outside network topology 300 and configured to communicate with the devices of network topology 300 via a link 320.

Figure 4:
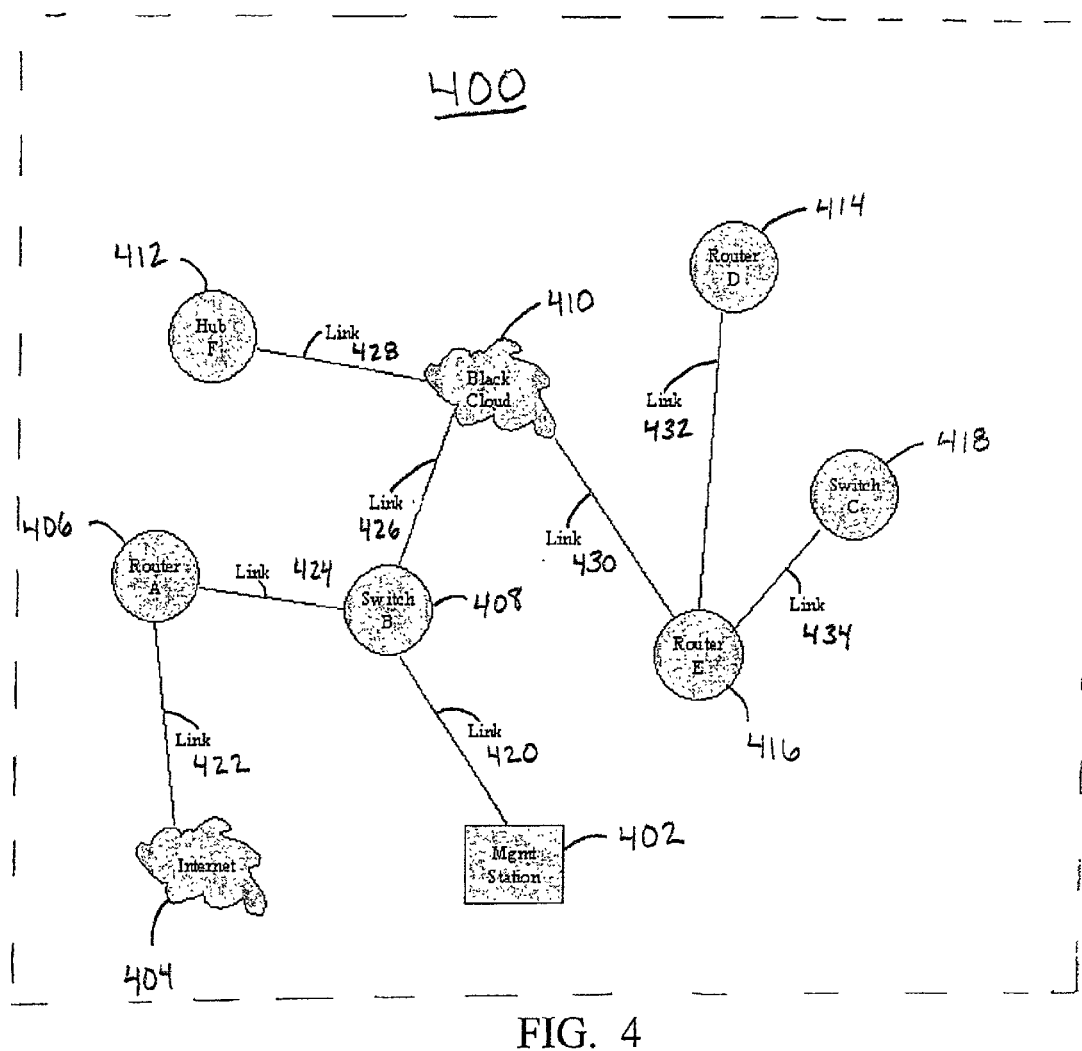
FIG. 4 illustrates an example of a management station that is located within a network topology.

FIG. 4 illustrates an example in which a management station 402 is located within a network topology 400, which includes a plurality of devices (402, 404, 406, 408, 410, 412, 414, 416, 418) that are configured to communicate over links (420, 422, 424, 426, 428, 430, 432, 434). In this example, management station 402 is located inside network topology 400 and configured to communicate with the devices of network topology via link 420.

In one embodiment, to determine whether the management station is within or outside a particular network topology, the IP address of the management station is compared to the subnets that are included within the network topology. If the IP address of the management station indicates that the management station is located within the network topology the MAC addresses observed on the switches and hubs within the network can be examined to identify the specific device that is associated with the management station. For example, by observing the MAC addresses associated with the packets that are being sent to the ports of the switches and hubs within the network topology, it can be determined whether a particular hub, switch, black cloud device, etc. is directly connected with the management station.

2. Determining Device Link Paths

Upon locating the management station, the path from the management station to each device within the network topology is computed as a vector of links that are traversed along the path. FIG. 5 illustrates a Link Vector table 500 that depicts a mapping for the network topology of FIG. 3 of each vector of links that are traversed to reach each device (302, 304, 306, 308, 310, 312, 314, 316, 318) from management station 302. For example, entry 502 indicates that in order for a message to be sent from management station 302 to, device 314 (Router D), the message must traverse a vector of links that includes links (320,322,324,326,330, 332).

Similarly, FIG. 6 illustrates a Link Vector table 600 that depicts a mapping (for the network topology of FIG. 4) of each vector of links that are traversed to reach each device (402, 404, 406, 408, 410, 412, 414, 416, 418) from management station 402. For example, entry 602 indicates that in order for a message to be sent from management station 402 to device 414 (Router D), the message must traverse a vector of links that includes links (420, 426, 430, 432).

3. Determining Beyond Link Device Sets

Based on the path that is determined to exist between the management station and each device within the network topology, as represented by a link vector, the failed-link discovery mechanism computes a set of "beyond link devices" for each link within the network topology. Beyond link devices are devices that are beyond a particular link from the perspective of the management station.

For example, FIG. 7 illustrates a Beyond Link Device table 700 that indicates whether a device is beyond a specific link from the perspective of the management station 302 based on the Link Vector table 500 of FIG. 5. Because column 502 of FIG. 5 indicates that device 314 is connected to the management station 302 through links (320, 322, 324, 326, 330, 332), by default, device 314 must be beyond each of these links (320, 322, 324, 326, 330, 332) from the perspective of the management station 302 as shown in column 702 of table 700. Furthermore, the row information in Beyond Link Device table 700 may be used to identify those devices that are beyond a particular link. For example, as indicated by row 704, only devices 314, 316 and 318 are beyond link 330 from the perspective of the management station.

FIG. 8 illustrates a Beyond Link Device table 800 that indicates whether a device is beyond a specific link from the perspective of the management station 402 based on the Link Vector table 600 of FIG. 6. Because column 602 of FIG. 6 indicates that device 414 is connected to the management station 402 through links (420, 426, 430, 432), by default, device 414 must be beyond each of these links (420, 426, 430, 432) from the perspective of the management station 402 as shown in column 802.

Link Failure Processing Phase

1. Polling Each Device in Network

The management station periodically polls each active device within the network (polling cycle) to determine a set of zero or more non-responding devices. For example, referring to FIG. 4, if the failed-link discovery mechanism determines that after polling each device (406, 408, 412, 414, 416, 418) that devices (414, 416, 418) failed to respond, the set of non-responding devices will consist of devices (414, 416, 418).

In one embodiment, to determine the set of non-responding devices the management station uses the Internet Control Message Protocol ("ICMP") to periodically "ping" each device within the network. One advantage of using a standardized communication protocol such ICMP is that a large percentage of network devices are configured to respond to the ping requests. In addition, the act of periodically pinging each device generally adds an insignificant amount of additional traffic on the network. However, other types of communication protocols may be used to poll the network devices. Thus, embodiments of the invention are not limited to any particular type of polling technique or communication protocol.

In certain embodiments, to identify non-responding devices, the management station polls each device at an initial interval (first attempt). In one embodiment, if a particular device fails to respond to the first attempt, the management station may then poll the device multiple times at another interval (second attempt). If the device fails to respond to the first attempt but succeeds on the second attempt, the management station records the device as a "slow response" device. Alternatively, if both attempts fail, the management station records the device as a "non-responding" device.

For example, referring to FIG. 3, to identify non-responding devices, the management station 302 may first attempt to ping each device over an initial two (2) second interval. Assuming that device 314 fails to respond to the first attempt, the management station 302 may then ping device 314 twice over a one (1) second interval (second attempt). If the first attempt fails but the second attempt succeeds then a slow response is recorded for device 314. Alternatively, if neither the first nor the second response succeeds, then device 314 is recorded as a non-responding device.

2. Identifying Non-Responding Devices

In certain embodiments, bit vectors are used to keep track of non-responding devices. For example, an ActiveDevice vector, a Response vector, a SlowResponse vector, and a NoResponse bit vector may be used for identifying slow and non-responding devices within a network topology.

Figure 9:
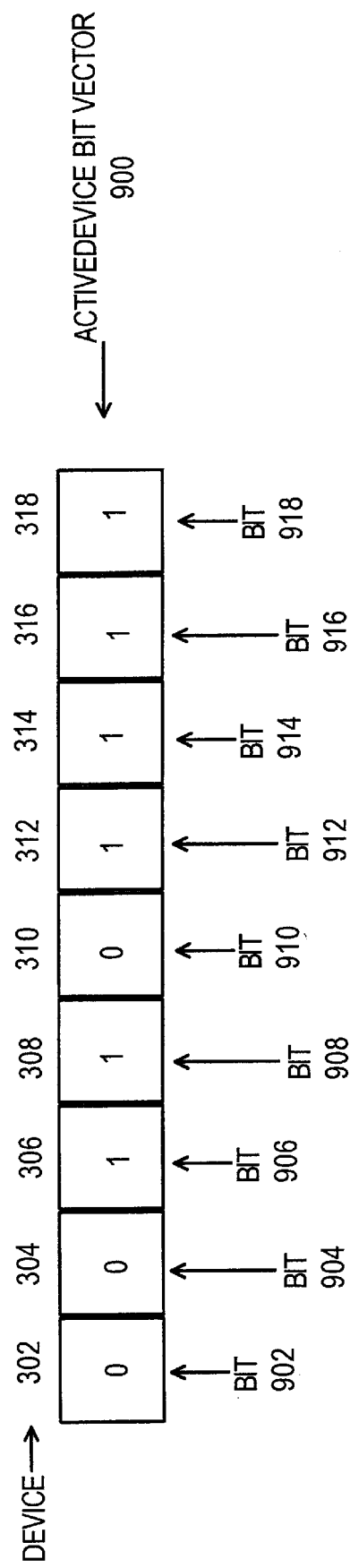
FIG. 9 illustrates an ActiveDevice bit vector that includes a set of bit values for the active devices of the network topology of FIG. 3.

The ActiveDevice bit vector is used to identify the devices within a particular network topology for which a response is expected. For example, FIG. 9 illustrates an ActiveDevice bit vector 900 that includes a set of bit values for the devices previously shown in FIG. 3. In this example, bits 902, 904 and 910 are set to zero ("0") as they represent devices in which no response is expected. For example, bit 904 is associated with device 304 (the Internet) and thus is not an actual active device within network topology 300. Similarly, bit 910 is associated with device 310 (Black Cloud) and thus is not an actual active device within network topology 300. Bits 906, 908, 912, 914, 916 and 918, are associated with network devices in which a response is expected. Thus, in this example the value of bits 906, 908, 912, 914, 916 and 918 are set to one ("1").

The Response bit vector is used to identify all devices that failed to respond during a polling cycle. The SlowResponse bit vector is used to identify all devices in which a slow response was detected during the polling cycle. The NoResponse bit vector is used to identify all devices that failed to respond during the particular polling cycle.

In one embodiment, at the start of each polling cycle, the Response, SlowResponse, and NoResponse bit vectors are initialized to all zeros. These bit vectors, along with the ActiveDevice bit vector are used to identify any "failed devices" (those devices that were expected to respond to the management stations polling but failed to respond). Based the set of identified failed devices, the failed-link discovery mechanism isolates a particular failed link within the network topology.

Figure 10:
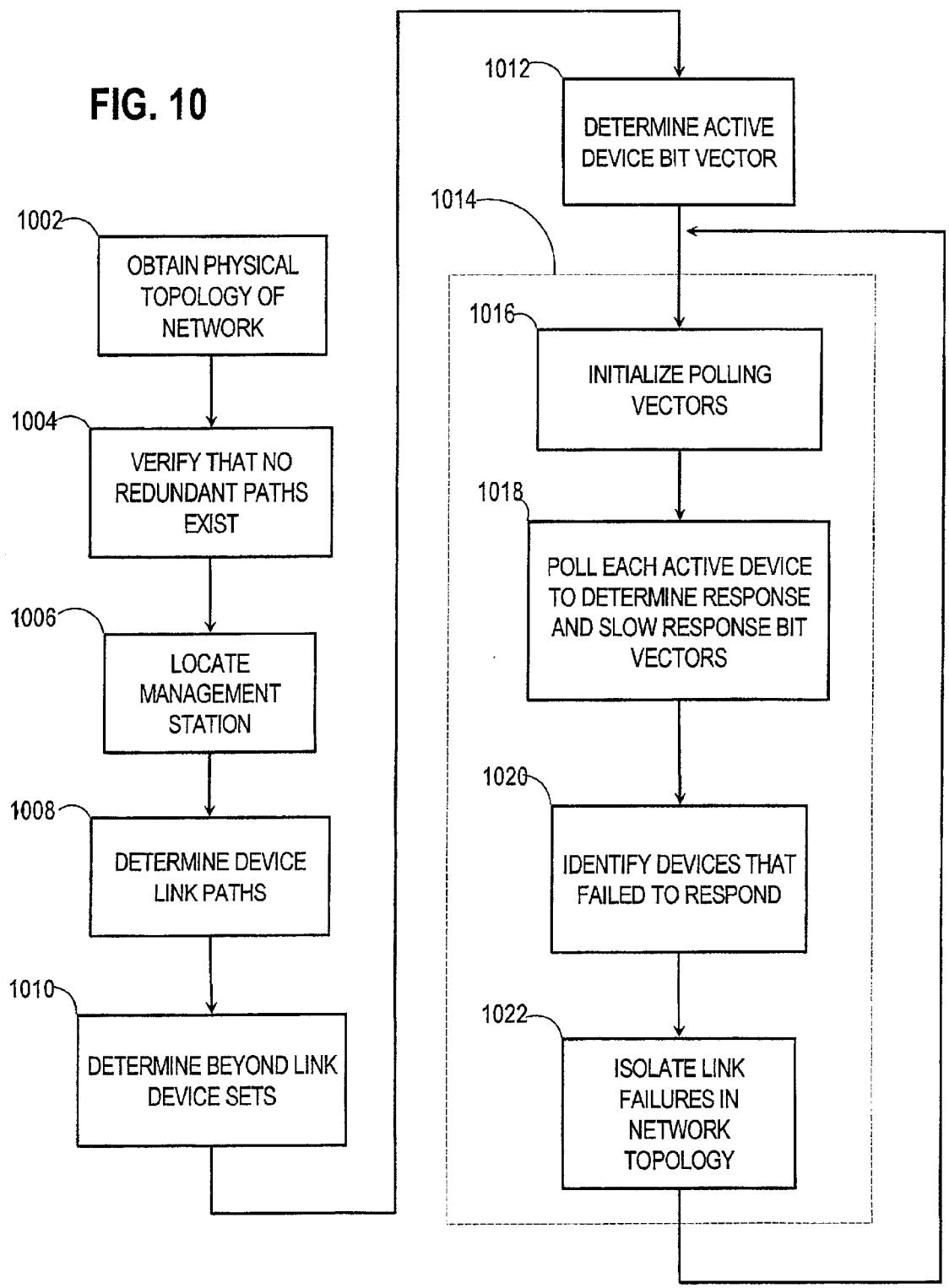
FIG. 10 is a flow diagram that illustrates steps involved in isolating a failed link within a network topology.

FIG. 10 is a flow diagram that illustrates an example of a process for isolating a failed link within a network topology in accordance with certain embodiments of the invention. For explanation purposes, FIG. 10 will be described in reference to FIG. 3, FIG. 5, and FIG. 7.

At block 1002 the physical topology of the network is obtained. For example, FIG. 3 illustrates a graphical image of a physical topology that may be obtained for a particular network.

At block 1004, the physical topology of the network is examined to verify that it does not contain any redundant paths.

At block 1006 the management station for the network is located. For example, as illustrated in FIG. 3, device 302 is identified as the management station for the network 300.

At block 1008 the device link paths are determined for each of the devices within the network topology. For example, as depicted in FIG. 5 the path from the management station (device 302) to each device within the network topology is determined.

At block 1010 the beyond link device sets are determined for each of the devices within the network topology. For example, as depicted in FIG. 7, the devices beyond each link, from the perspective of the management station, are determined.

At block 1012 the devices in which a response is expected to be received are identified. For example, as depicted in FIG. 9, in one embodiment an ActiveDevice bit vector is initialized to identify those devices in which a reply is expected to be received by the management station in response to messages being sent to the devices within the network topology.

At block 1014 a polling cycle is initiated to identify any non-responding devices that were expected to respond and to isolate a failed link if any non-responding devices are detected.

Figure 11A:
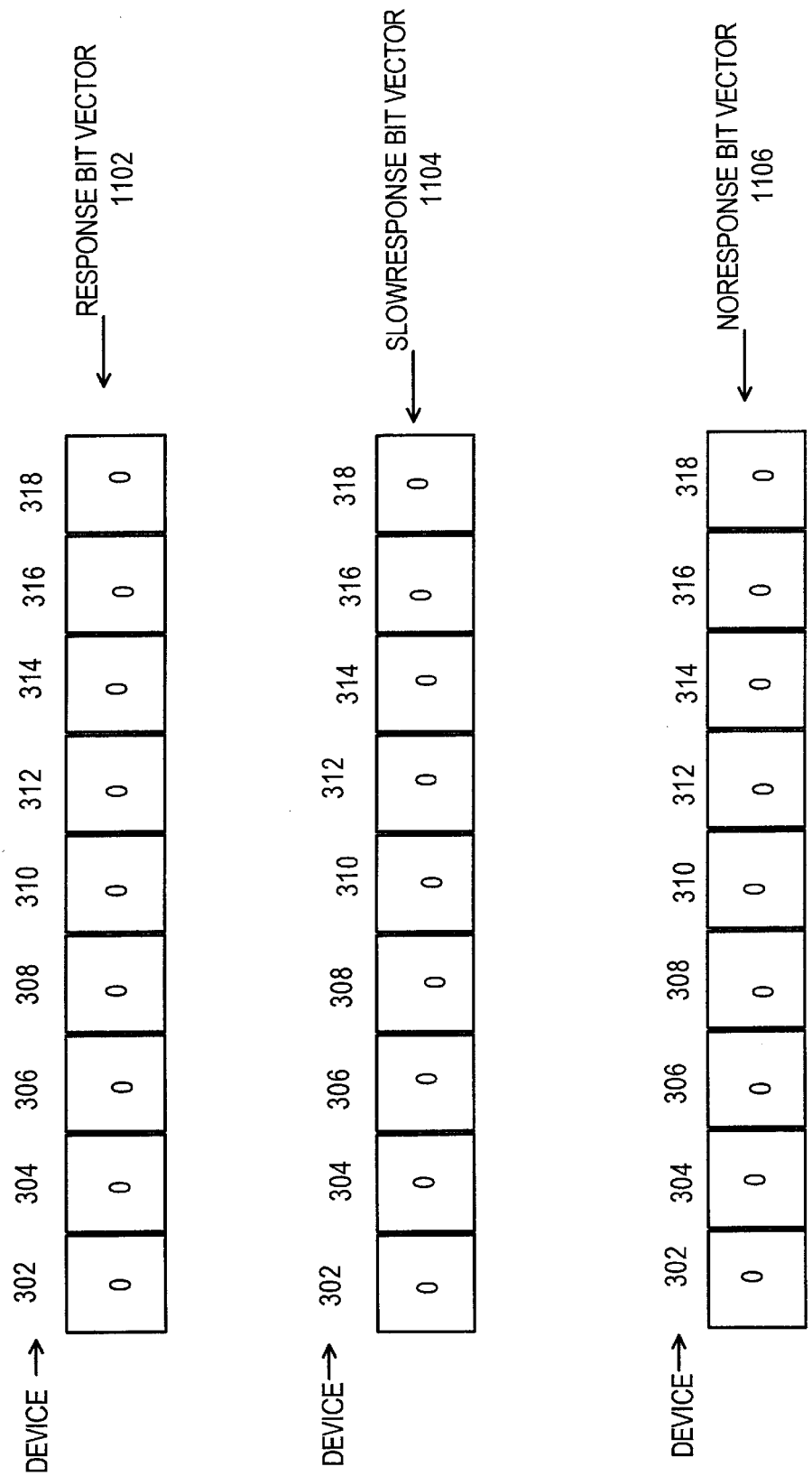
FIG. 11A illustrates the initialization of a Response, SlowResponse, and NoResponse bit vectors.

At block 1016 the polling vectors are initialized to zero ("0"). For example, as depicted in FIG. 11A, the Response, the SlowResponse, and the NoResponse bit vectors are initialized to all zeros.

Figure 11B:
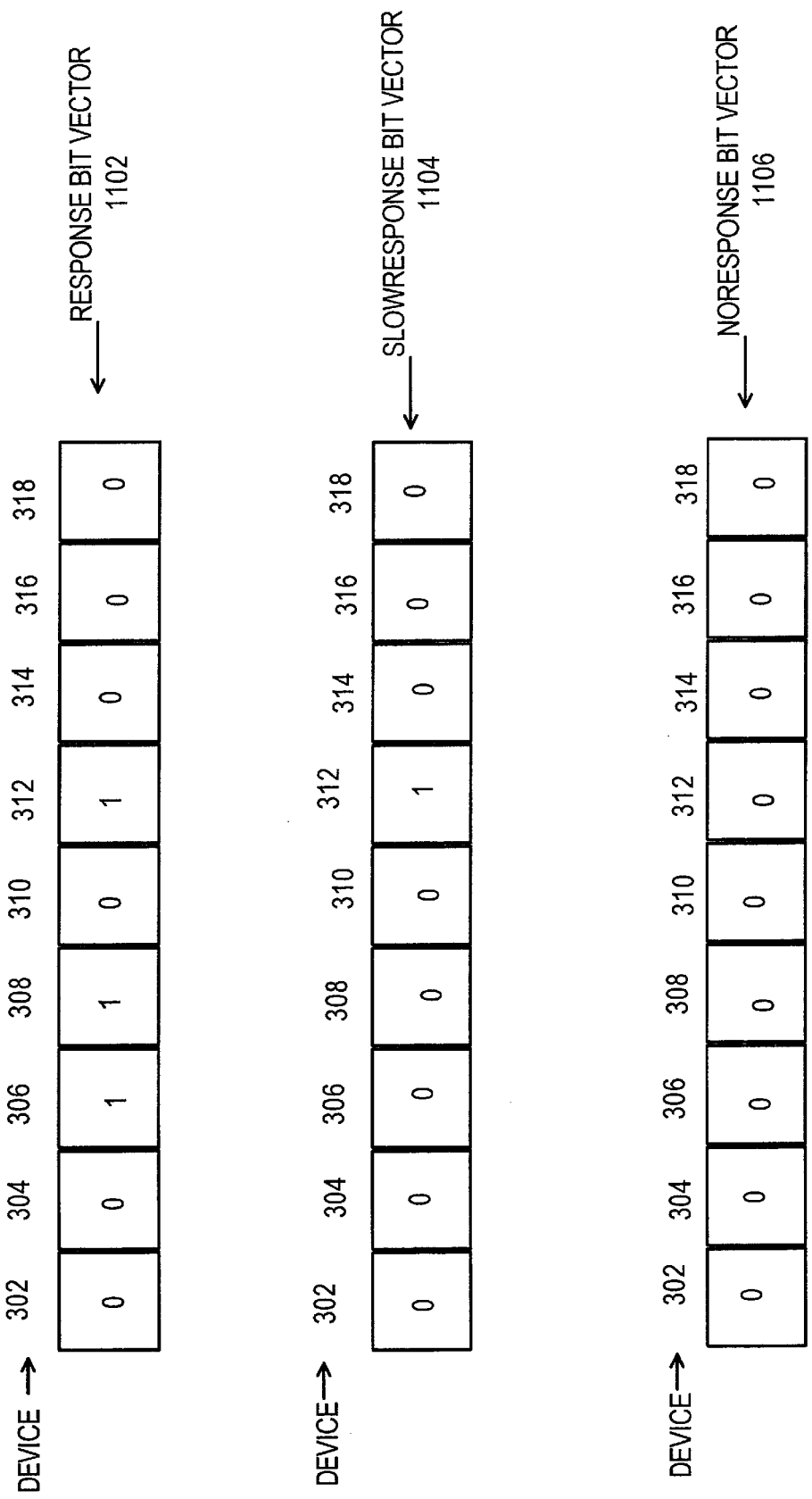
FIG. 11B illustrates the updating of the polling vectors based on the devices that respond to the management station messages.

At block 1018, each active device is polled to identify non-responding and slow responding devices. In certain embodiments, if a particular device does not respond to the initial message (ping) from the management station, a second message or group of messages (multiple pings) are sent to the device to potentially identify the device as a slow responding device. For example, it shall be assumed that during the first polling sequence the management station receives a response from only devices 306, 308 of FIG. 3. It shall also be assumed that during the second polling sequence the management station receives a response from device 312, thus concluding that devices 302, 304, 310, 314, 316, 318 are non-responding devices and that devices 306, 308, 312 are all responding devices, but that device 312 is a slow responding device. Based on these assumptions, the polling vectors (Response, SlowResponse, and NoResponse bit vectors) are updated as shown in FIG. 11B.

At block 1020 the devices that should have responded, but did not, are identified. In one embodiment, the Response and ActiveDevice bit vectors are used to generate values for the NoResponse bit vector which, when generated, identifies the devices that failed to respond during the polling cycle. For example, FIG. 11C illustrates one method of using the bit vectors to identify the devices that that failed to respond. As depicted, in step 1, a logical bit-wise "AND" is performed on the ActiveDevice bit vector 900 and the Response bit vector 1102 to generate an INTERMEDIATE bit vector 1108. Next at step 2, a logical bit-wise "XOR" is performed on the INTERMEDIATE bit vector 1108 and an ALLONES bit vector 1110 to generate NORESPONSE bit vector 1106.

At block 1022, for each link within the network topology, the failed link discovery mechanism uses the results of the NoResponse bit vector 1106 and the set of beyond link device information (FIG. 7) to determine whether all devices beyond a particular link are not responding. If a link is identified in which no devices beyond that link are responding, the failed link discovery mechanism traverses backwards to each previous link on the path to the management station until it finds the last link for which all devices beyond that point do not respond. Based on this information, the failed link discovery mechanism can isolate a specific link that has failed in the network topology.

Figure 1:
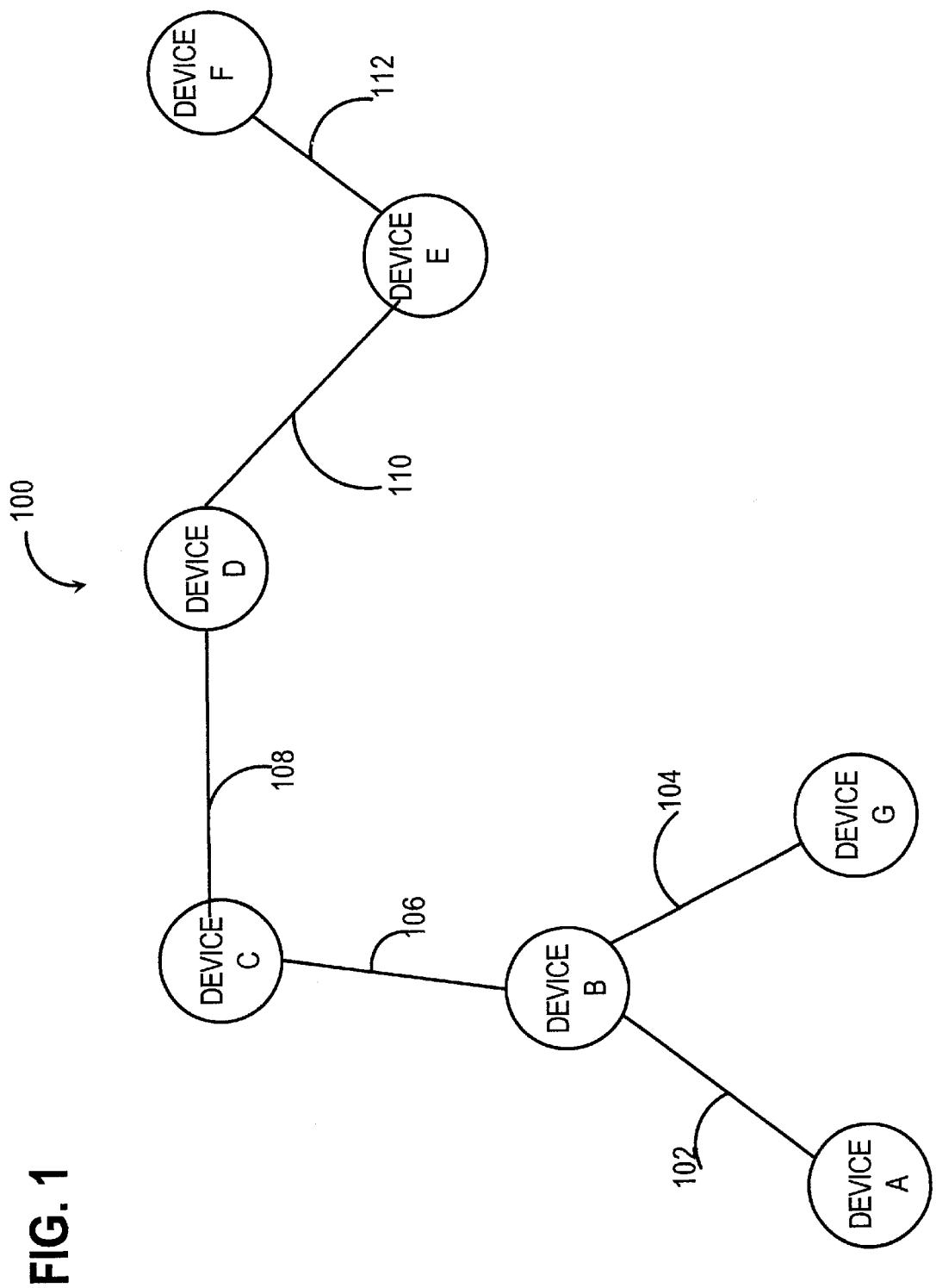
FIG. 1 illustrates a network that includes a plurality of devices that are configured to communicate with each other over links within a network.

For example, by comparing the beyond link device information for link 330 (row 704 of FIG. 7) with the NoResponse bit vector 1106 (FIG. 1C), it can be determined that all devices that are beyond link 330 (devices 314, 316, 318) failed to respond to the management station. Also, in traversing backwards towards the management station within the network topology (FIG. 3) from link 330, the failed link discovery mechanism determines that the previous link to link 330 from the perspective of the management station is link 326. The beyond link device information for link 326 is then compared with the results of the NoResponse bit vector 1106 to determine whether all devices that are beyond link 326 (devices 310, 312, 314, 316, 318) failed to respond to the management station, thus indicating that link 326 may have possibly failed. However, in this example, the results of the NoResponse bit vector 1106 indicate that device 312 did respond to the management station. Therefore, the failed link discovery mechanism determines that link 326 has not failed and that link 330 is the failed link within the network topology.

Alternatively, if it was determined that device 312 had failed to respond to the management station, the failed link discovery mechanism would have determined that link 326 had possibly failed within the network topology, and thus proceed to traverse backwards to check whether link 324 (the previous link to link 326 from the perspective of the management station) had possibly failed.

At the completion of the polling cycle sequence, the process may proceed to block 1016 to perform another polling cycle sequence to continue to identify and isolate failures within the network.

Hardware Overview

Figure 12:
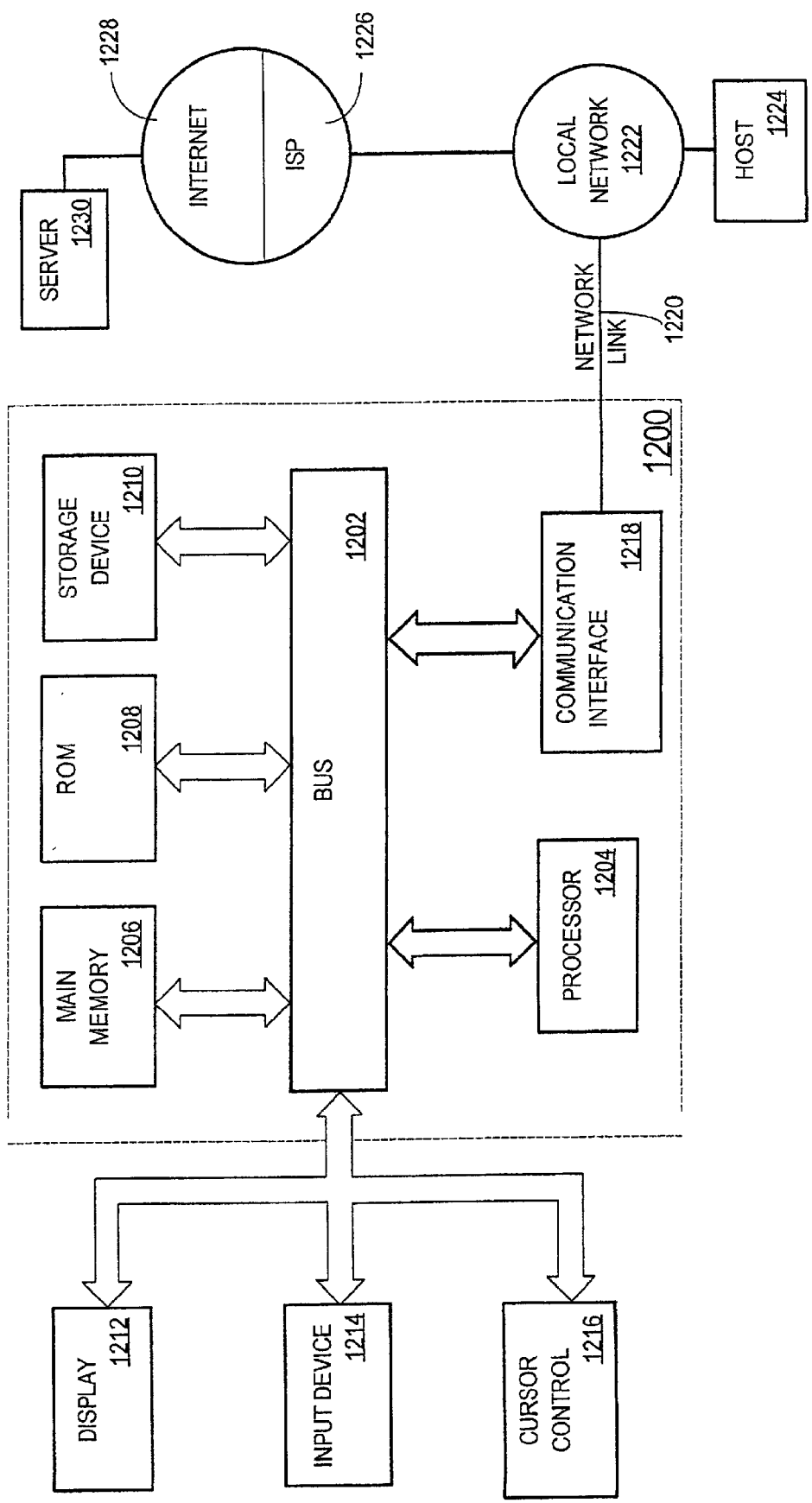
FIG. 12 is a block diagram of a computer system hardware arrangement that can be used to implement aspects of the invention.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for determining a physical topology of network devices in a network. According to one embodiment of the invention, determining a physical topology of network devices in a network is carried out by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. In accordance with the invention, one such: downloaded application provides for determining a physical topology of network devices in a network as described herein.

The received code may be executed by processor 1204 as it is received, and/or stored in storage device 1210, or other non-volatile storage for later execution. In this manner, computer system 1200 may obtain application code in the form of a carrier wave.

Alternatives, Extensions

The failed link discovery mechanism that is described herein allows an operator to identify and isolate link failures within a network topology. By isolating failures within a network, the network administrator is provided with a tool that will allow them to quickly identify and resolve problems with a network system.

In describing certain embodiments of the invention, several drawing figures have been used for explanation purposes. However, the invention is not limited to any particular context as shown in drawing figures, and the spirit and scope of the invention include other contexts and applications in which the mechanisms and processes described herein is available to other mechanisms, methods, programs, and processes. Thus, the specification and drawings are, accordingly, to be regarded in an illustrative rather than a restrictive sense.

For example, the link discovery mechanism has been described in reference to certain devices of Cisco Systems, Inc., but embodiments of the invention are not limited to use with any particular devices.

As another example, certain embodiments have been described as having no redundant paths within the network topology. However, within virtual devices, such as Black Cloud devices or the Internet, there may be many redundant physical paths that do not interfere with the Link Failure Discovery mechanism since the mechanism treats each such entity as a single opaque node that is not active. For example, because the network traffic will either traverse or not traverse a particular virtual device (i.e., Black Cloud or Internet), whatever path the traffic takes within such a virtual device is typically irrelevant.

Figure 13:
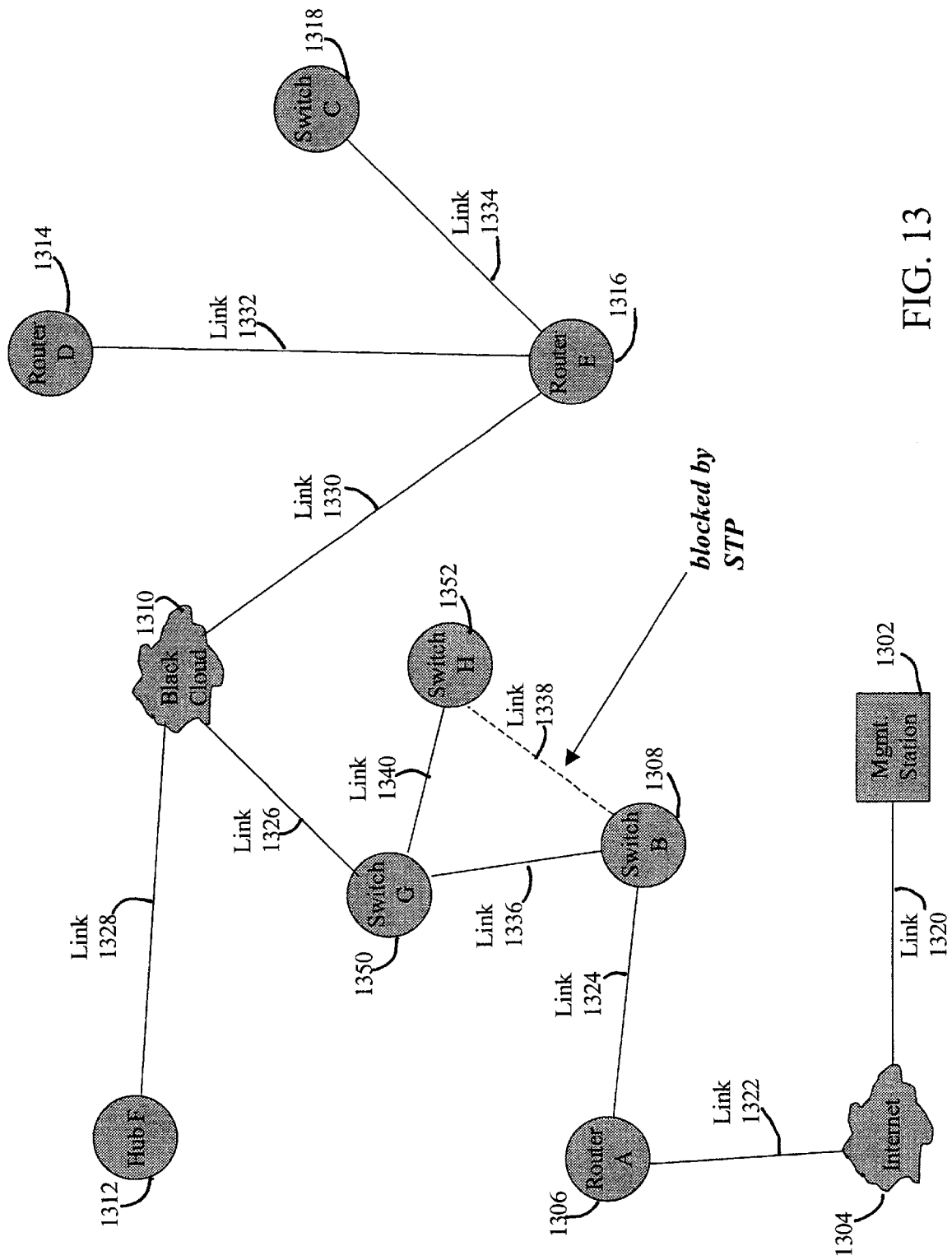
FIG. 13 illustrates a physically redundant network that uses the Spanning Tree Protocol to remove multiple communication paths between one or more devices pairs.

However, in certain cases, the managed portion of a network administrator's network may include physically redundant paths that are associated with active devices to increase the network's reliability. A very common example of this is the use of multiple physical connections among switches. FIG. 13, a variation of FIG. 3, illustrates an example of such a case. In this example, there are multiple physical paths for network traffic from link 1324 to link 1326. Typically, in this situation, the Switches B, G, and H (devices 1308,1350,1352) will be running a Spanning Tree Protocol (STP) in which one link is blocked from passing traffic to prevent a condition known as "storms" where network packets continue to loop around the cycle of switches B, G, and H. In certain embodiments, the Link Failure Discovery mechanism may be extended to handle these kinds of redundant paths as follows. First, referring to FIG. 10, in block 1002 the step of obtaining the physical topology is extended to obtaining a physical topology that includes only the non-blocked or active links. This may be done by obtaining the entire physical topology and then subtracting the blocked links that may be learned through STP. Blocks 1004 through 1022 may then proceed as previously described for FIG. 10. However, after block 1022, and before looping back to the beginning of block 1014, an additional step is performed to check whether there has been a Spanning Tree change (generally available as an SNMP trap). In one embodiment, if a Spanning Tree change has occurred, instead of proceeding to block 1014, the flow diagram returns to block 1002 to obtain a new "adjusted" physical topology. In certain instances, the Link Failure Discovery mechanism may have to "suspend operations" (wait) for a brief period of time to allow the new Spanning Tree to "converge".

In addition, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for identifying failures of links in a network, the method comprising the computer-implemented steps of:
receiving information that represents a physical topology of the network;
determining a path between a particular network device and a management station that is associated with the network, wherein the path consists of one or more links that connect devices within the network;
determining, based on whether the particular network device is between one or more devices of the network and the management station, a set of beyond link devices, wherein the set of beyond link devices includes only devices that can communicate with the management station through the particular network device and that cannot communicate with the management station without the particular network device;
sending a first message to one or more active devices within the network, wherein each first message requests a response to be returned from the device for which the message was sent;
determining a set of non-responding devices within the network based on responses to the first messages; and
comparing the set of non-responding devices to the set of beyond link devices to identify link failures within the network.

2. The method as recited in claim 1, wherein the step of sending a first message includes the step of sending an Internet Control Message Protocol ("ICMP") message to one or more devices within the network.

3. The method as recited in claim 1, wherein the step of determining a set of non-responding devices includes the steps of:
sending a second message to devices within the network that did not respond to the first message; and
identifying a particular device as a non-responding device only if the particular device fails to respond to the second message.

4. The method as recited in claim 3, further comprising the step of identifying a set of slow responding devices, wherein the set of slow responding devices includes those devices that responded to the second message from the management station.

5. The method as recited in claim 1, wherein the step of determining a set of non-responding devices within the network includes the step of maintaining an active device bit vector that identifies devices for which a response is expected in response to sending the first messages.

6. A method for identifying failures of links in a network, the method comprising the computer-implemented steps of:
receiving information that represents a physical topology of the network;
determining a path between one or more devices of the network and a management station that is associated with the network, wherein each path consists of one or more links that connects devices within the network;
determining for each link a set of beyond link devices, wherein each set of beyond link devices includes only devices that are beyond a particular link relative to the management station;
sending a first message to one or more active devices within the network, wherein each first message requests a response to be returned from the device for which the message was sent;
determining a set of non-responding devices within the network based on responses to the first messages, wherein the step of determining a set of non-responding devices within the network includes the step of maintaining an active device bit vector that identifies devices for which a response is expected in response to sending the first messages;
comparing the set of non-responding devices to each set of beyond link devices to identify link failures within the network;
computing a response bit vector, wherein the response vector identifies devices that responded to the first messages;
computing an intermediate bit vector by performing a logical bitwise AND between the active device bit vector and the response bit vector; and
computing a non-response bit vector by performing a logical bitwise exclusive-or (XOR) between the intermediate bit vector and an all ones bit vector, wherein the non-response bit vector identifies all devices for which a response was not received.

7. The method as recited in claim 1, wherein:
the step of sending a first message to one or more active devices within the network further includes the steps of:
polling one or more devices at a first frequency rate to determine an initial set of non-responding devices; and
polling at a second frequency rate devices within the initial set of non-responding devices to determine a set of slow-responding devices, wherein the first frequency rate and the second frequency rate represent different polling rates; and the step of determining a set of non-responding devices within the network comprises the step of comparing the initial set of non-responding devices to the set of slow-responding devices to determine the set of non-responding devices.

8. A computer-readable medium carrying one or more sequences of instructions for identifying link failures in a network, wherein execution of the one or more sequences of instructions by one or more processors causes the one or more processors to perform the steps of:

receiving information that represents a physical topology of the network;

determining a path between a particular network devices and a management station that is associated with the network, wherein the path consists of one or more links that connect devices within the network;

determining, based on whether the particular network device is between one or more devices of the network and the management station, a set of beyond link devices, wherein the set of beyond link devices includes only devices that can communicate with the management station through the particular network device and that cannot communicate with the management station without the particular network device;

sending a first message to one or more active devices within the network, wherein each first message requests a response to be returned from the device for which the message was sent;

determining a set of non-responding devices within the network based on responses to the first messages; and comparing the set of non-responding devices to the set of beyond link devices to identify link failures within the network.

9. The computer-readable medium as recited in claim 8, wherein the step of sending a first message includes the step of sending an Internet Control Message Protocol ("ICMP") message to one or more devices within the network.

10. The computer-readable medium as recited in claim 8, wherein the step of determining a set of non-responding devices includes the steps of:

sending a second message to devices within the network that did not respond to the first message; and identifying a particular device as a non-responding device only if the particular device fails to respond to the second message.

11. The computer-readable medium as recited in claim 10, further comprising instructions for performing the step of identifying a set of slow responding devices, wherein the set of slow responding devices includes those devices that responded to the second message from the management station.

12. The computer-readable medium as recited in claim 8, wherein the step of determining a set of non-responding devices within the network includes the step of maintaining an active device bit vector that identifies devices for which a response is expected in response to sending the first messages.

13. A computer-readable medium carrying one or more sequences of instructions for identifying link failures in a network, wherein execution of the one or more sequences of instructions by one or more processors causes the one or more processors to perform the steps of:

receiving information that represents a physical topology of the network;

determining a path between one or more devices of the network and a management station that is associated with the network, wherein each path consists of one or more links that connects devices within the network;

determining for each link a set of beyond link devices, wherein each set of beyond link devices includes only devices that are beyond a particular link relative to the management station;

sending a first message to one or more active devices within the network, wherein each first message requests a response to be returned from the device for which the message was sent;

determining a set of non-responding devices within the network based on responses to the first messages, wherein the step of determining a set of non-responding devices within the network includes the step of maintaining an active device bit vector that identifies devices for which a response is expected in response to sending the first messages;

comparing the set of non-responding devices to each set of beyond link devices to identify link failures within the network;

computing a response bit vector, wherein the response vector identifies devices that responded to the first messages;

computing an intermediate bit vector by performing a logical bitwise AND between the active device bit vector and the response bit vector; and computing a non-response bit vector by performing a logical bitwise exclusive-or (XOR) between the intermediate bit vector and an all ones bit vector, wherein the non-response bit vector identifies all devices for which a response was not received.

14. The computer-readable medium as recited in claim 8, wherein:

the step of sending a first message to one or more active devices within the network further includes the steps of:

polling one or more devices at a first frequency rate to determine an initial set of non-responding devices; and polling at a second frequency rate devices within the initial set of non-responding devices to determine a set of slow-responding devices, wherein the first frequency rate and the second frequency rate represent different polling rates; and the step of determining a set of non-responding devices within the network comprises the step of comparing the initial set of non-responding devices to the set of slow-responding devices to determine the set of non-responding devices.

15. A network device configured for identifying link failures in a network, comprising:

a network interface;

a processor coupled to the network interface and receiving information from the network interface;

a computer-readable medium accessible by the processor and comprising one or more sequences of instructions which, when executed by the processor, cause the processor to carry out the steps of:

receiving information that represents a physical topology of the network;

determining a path between a particular network devices and a management station that is associated with the network, wherein the path consists of one or more links that connect devices within the network;

determining, based on whether the particular network device is between one or more devices of the network and the management station, a set of beyond link devices, wherein the set of beyond link devices includes only devices that can communicate with the management station through the particular network device and that cannot communicate with the management station without the particular network device;

sending a first message to one or more active devices within the network, wherein each first message requests a response to be returned from the device for which the message was sent;

determining a set of non-responding devices within the network based on responses to the first messages; and comparing the set of non-responding devices to the set of beyond link devices to identify link failures within the network.

16. The network device as recited in claim 15, wherein the step of sending a first message includes the step of sending an Internet Control Message Protocol ("ICMP") message to one or more devices within the network.

17. The network device as recited in claim 15, wherein the step of determining a set of non-responding devices includes the steps of:

sending a second message to devices within the network that did not respond to the first message; and identifying a particular device as a non-responding device only if the particular device fails to respond to the second message.

18. The network device as recited in claim 17, further configured for performing the step of identifying a set of slow responding devices, wherein the set of slow responding devices includes those devices that responded to the second message from the management station.

19. The network device as recited in claim 15, wherein the step of determining a set of non-responding devices within the network includes the step of maintaining an active device bit vector that identifies devices for which a response is expected in response to sending the first messages.

20. A network device configured for identifying link failures in a network, comprising:

a network interface;

a processor coupled to the network interface and receiving information from the network interface;

a computer-readable medium accessible by the processor and comprising one or more sequences of instructions which, when executed by the processor, cause the processor to carry out the steps of: receiving information that represents a physical topology of the network;

determining a path between one or more devices of the network and a management station that is associated with the network, wherein each path consists of one or more links that connects devices within the network;

determining for each link a set of beyond link devices, wherein each set of beyond link devices includes only devices that are beyond a particular link relative to the management station;

sending a first message to one or more active devices within the network, wherein each first message requests a response to be returned from the device for which the message was sent;

determining a set of non-responding devices within the network based on responses to the first messages, wherein the step of determining a set of non-responding devices within the network includes the step of maintaining an active device bit vector that identifies devices for which a response is expected in response to sending the first messages;

comparing the set of non-responding devices to each set of beyond link devices to identify link failures within the network;

computing a response bit vector, wherein the response vector identifies devices that responded to the first messages;

computing an intermediate bit vector by performing a logical bitwise AND between the active device bit vector and the response bit vector; and computing a non-response bit vector by performing a logical bitwise exclusive-or (XOR) between the intermediate bit vector and an all ones bit vector, wherein the non-response bit vector identifies all devices for which a,response was not received.

21. The network device as recited in claim 15, wherein:

the step of sending a first messages one or more active devices within the network further includes the steps of:

polling one or more devices at a first frequency rate to determine an initial set of non-responding devices; and polling at a second frequency rate devices within the initial set of non-responding devices to determine a set of slow-responding devices, wherein the first frequency rate and the second frequency rate represent different polling rates; and the step of determining a set of non-responding devices within the network comprises the step of comparing the initial set of non-responding devices to the set of slow-responding devices to determine the set of non-responding devices.

22. A network device configured for identifying link failures in a network, comprising:

means for receiving information that represents a physical topology of the network;

means for determining a path between a particular network device and a management station that is associated with the network, wherein the path consists of one or more links connecting one or more devices within the network;

means for determining, based on whether the particular network device is between one or more devices of the network and the management station, a set of beyond link devices, wherein the set of beyond link devices includes only devices that can communicate with the management station through the particular network device and that cannot communicate with the management station without the particular network device;

means for sending a first message to each active device within the network, wherein each first message requests a response to be returned from the device for which the message was sent;

means for determining a set of non-responding devices within the network based on responses to the first messages; and means for comparing the set of non-responding devices to the set of beyond link devices to identify link failures within the network.

23. A method for identifying failures of links in a network, the method comprising the computer-implemented steps of:

obtaining information that represents a physical topology of the network;

verifying that the network does not include any redundant paths;

identifying a management station that is associated with the network;

determining a path between a particular network device and the management station, wherein the path consists of one or more links connecting one or more devices within the network;

determining a set of beyond link devices, wherein the set of beyond link devices includes only devices that can communicate with the management station through the particular network device and that cannot communicate with the management station without the particular network device;

polling each active device within the network to determine a set of non-responding devices; and comparing the set of non-responding devices to the set of beyond link devices to identify link failures within the network.

* * * * *

UNITED STATES PATENT AND TRADEMARK OFFICE
CERTIFICATE OF CORRECTION

PATENT NO. : 6,804,712 B1
DATED : October 12, 2004
INVENTOR(S) : James Kracht

It is certified that error appears in the above-identified patent and that said Letters Patent is hereby corrected as shown below:

Column 15,
Line 15, "devices" should read -- device --;

Column 16,
Line 64, "devices" should read -- device --;

Column 18,
Line 21, "messages" should read -- message to --.

Signed and Sealed this

Twenty-second Day of February, 2005

JON W. DUDAS
*Director of the United States Patent and Trademark Office*